United States Patent
Sugimoto (10) Patent No.: US 8,656,973 B2
(45) Date of Patent: Feb. 25, 2014

(54) POLYMER SHEET FOR INNER LINER, POLYMER LAMINATE FOR INNER LINER, AND PNEUMATIC TIRE

(75) Inventor: Mutsuki Sugimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 215 days.

(21) Appl. No.: 13/182,537

(22) Filed: Jul. 14, 2011

(65) Prior Publication Data

US 2012/0024447 A1 Feb. 2, 2012

(30) Foreign Application Priority Data

Jul. 30, 2010 (JP) .................................. 2010-172394
Nov. 15, 2010 (JP) .................................. 2010-254501

(51) Int. Cl.
*B60C 5/14* (2006.01)
*B60C 1/00* (2006.01)

(52) U.S. Cl.
USPC ....................................... 152/510; 428/411.1

(58) Field of Classification Search
None
See application file for complete search history.

(56) References Cited

U.S. PATENT DOCUMENTS

| | | | |
|---|---|---|---|
| 4,569,382 A * | 2/1986 | Maxey et al. ................. | 152/548 |
| 4,910,321 A | 3/1990 | Kennedy et al. | |
| 4,946,899 A | 8/1990 | Kennedy et al. | |
| 5,219,948 A | 6/1993 | Storey et al. | |
| 5,447,976 A * | 9/1995 | Curtin et al. ................... | 523/438 |
| 6,079,465 A * | 6/2000 | Takeyama et al. ............. | 152/510 |
| 7,927,695 B2 * | 4/2011 | Raulie ........................ | 428/319.3 |
| 2004/0030036 A1 * | 2/2004 | Waddell et al. ............... | 524/567 |
| 2006/0229402 A1 | 10/2006 | Varma | |
| 2008/0249236 A1 | 10/2008 | Nakashima et al. | |
| 2010/0175804 A1 | 7/2010 | Lesage et al. | |
| 2010/0294411 A1 | 11/2010 | Custodero et al. | |
| 2011/0011511 A1 | 1/2011 | Miyazaki et al. | |
| 2011/0056604 A1 | 3/2011 | Sugimoto | |
| 2012/0003413 A1 | 1/2012 | Lesage et al. | |

FOREIGN PATENT DOCUMENTS

| | | |
|---|---|---|
| FR | 2001-279051 A | 10/2001 |
| FR | 2 916 679 A1 | 12/2008 |
| FR | 2 917 010 A1 | 12/2008 |
| JP | 62-048704 A | 3/1987 |
| JP | 64-062308 A | 3/1989 |
| JP | 03-174403 A | 7/1991 |
| JP | 09-165469 A | 6/1997 |
| JP | 2004-90589 * | 3/2004 |
| JP | 2007-326909 A | 12/2007 |
| JP | 2008-127443 A | 6/2008 |

(Continued)

*Primary Examiner* — Justin Fischer
(74) *Attorney, Agent, or Firm* — Birch, Stewart, Kolasch & Birch, LLP (57) ABSTRACT

A pneumatic tire is provided which includes a polymer sheet for an inner liner composed of a polymer composition including: a polymer component containing more than or equal to 5% by mass and less than or equal to 40% by mass of a styrene-isobutylene-styrene triblock copolymer and more than or equal to 60% by mass and less than or equal to 95% by mass of a rubber component of at least one kind selected from the group consisting of natural rubber, isoprene rubber, and butyl rubber; and more than or equal to 0.1 part by mass and less than or equal to 5 parts by mass of sulfur with respect to 100 parts by mass of the polymer component. The pneumatic tire has sufficient tackiness before vulcanization and vulcanization adhesiveness between the inner liner and a member adjacent thereto, and exhibits excellent air permeation resistance.

10 Claims, 2 Drawing Sheets

(56) References Cited

FOREIGN PATENT DOCUMENTS

| | | |
|---|---|---|
| JP | 2010-013646 A | 1/2010 |
| JP | 2010-0100675 A | 5/2010 |
| JP | 2011-51320 A | 3/2011 |
| WO | WO 2005/033035 A1 | 4/2005 |
| WO | WO 2008/154996 A1 | 12/2008 |
| WO | WO 2009/119232 A1 | 10/2009 |
| WO | WO 2010/063427 A1 | 6/2010 |

* cited by examiner

POLYMER SHEET FOR INNER LINER, POLYMER LAMINATE FOR INNER LINER, AND PNEUMATIC TIRE

This nonprovisional application is based on Japanese Patent Application No. 2010-172394 filed on Jul. 30, 2010 and No. 2010-254501 filed on Nov. 15, 2010, with the Japan Patent Office, the entire contents of which are hereby incorporated by reference.

BACKGROUND OF THE INVENTION

1. Field of the Invention

The present invention relates to a polymer sheet for inner liner, a polymer laminate for inner liner, and a pneumatic tire using them.

2. Description of the Background Art

Recently, an attempt has been made to perform weight saving of tires because of strong social demands for fuel economy of automobiles. An attempt has also been made to perform weight saving of inner liners, among tire members, that are disposed at a tire radial inner side and have the function of improving air permeation resistance by decreasing the amount of air leaked to the outside from the inside of pneumatic tires (air permeation amount).

In a rubber composition for an inner liner, an improvement in air permeation resistance of tires is performed by using a butyl-based rubber containing 70 to 100% by mass of a butyl rubber and 30 to 0% by mass of a natural rubber. The butyl-based rubber contains, in addition to butylene, about 1% by mass of isoprene that enables co-crosslinking with an adjacent rubber along with sulfur, a vulcanization accelerator and zinc white. In the case of a conventional formulation, the butyl-based rubber requires a thickness of 0.6 to 1.0 mm for tires for passenger cars, or a thickness of about 1.0 to 2.0 mm for tires for trucks and buses.

In order to perform weight saving of tires, it has been proposed to use, as an inner liner, a thermoplastic elastomer that has excellent air permeation resistance as compared with the butyl-based rubber and can decrease the thickness of an inner liner layer. However, the thermoplastic elastomer that shows high air permeation resistance with a smaller thickness than that of the butyl-based rubber is inferior in vulcanization adhesiveness with an insulation or carcass rubber adjacent to the inner liner as compared with the butyl-based rubber. When the inner liner has low vulcanization adhesiveness, an air-in phenomenon occurs in which air permeates into the space between the inner liner and the insulation or the carcass, and thus a number of small air bubbles appear. This phenomenon raises a problem that a small spot pattern formed inside tires gives an impression of poor appearance to users. Further, air bubbles may cause the inner liner to peel off the insulation or carcass during driving, resulting in cracks in the inner liner to decrease a tire internal pressure. In the worst case, tires may burst.

Japanese Patent Laying-Open No. 09-165469 (Patent Document 1) proposes a pneumatic tire capable of improving adhesiveness between an inner liner and a rubber composition that forms the inner surface of the tire or the carcass layer by forming an inner liner layer using nylon having low air permeability. However, in the technique of Patent Document 1, there is a problem that a rubber cement composed of a rubber composition must be bonded to a nylon film having been subjected to an RFL treatment so as to form a nylon film layer, resulting in complicated steps.

SUMMARY OF THE INVENTION

An object of the present invention is to provide a polymer sheet for an inner liner and a polymer laminate for an inner liner both having sufficient tackiness before vulcanization and vulcanization adhesiveness with a member adjacent to the inner liner and excellent air permeation resistance, as well as a pneumatic tire using them.

The present invention is directed to a polymer sheet for an inner liner composed of a polymer composition including: a polymer component containing more than or equal to 5% by mass and less than or equal to 40% by mass of a styrene-isobutylene-styrene triblock copolymer and more than or equal to 60% by mass and less than or equal to 95% by mass of a rubber component of at least one kind selected from the group consisting of natural rubber, isoprene rubber, and butyl rubber; and more than or equal to 0.1 part by mass and less than or equal to 5 parts by mass of sulfur with respect to 100 parts by mass of the polymer component.

Preferably, the polymer sheet for an inner liner of the present invention further contains, with respect to 100 parts by mass of the polymer component, more than or equal to 1 part by mass and less than or equal to 5 parts by mass of stearic acid, more than or equal to 0.1 part by mass and less than or equal to 8 parts by mass of zinc oxide, more than or equal to 0.1 part by mass and less than or equal to 5 parts by mass of an antioxidant, and more than or equal to 0.1 part by mass and less than or equal to 5 parts by mass of a vulcanization accelerator.

Preferably, in the polymer sheet for an inner liner of the present invention, the styrene-isobutylene-styrene triblock copolymer has a weight-average molecular weight more than or equal to 50,000 and less than or equal to 400,000 and a styrene unit content more than or equal to 10% by mass and less than or equal to 30% by mass.

The present invention is also directed to a polymer laminate for an inner liner including: a first layer composed of a polymer composition including a polymer component containing more than or equal to 5% by mass and less than or equal to 40% by mass of a styrene-isobutylene-styrene triblock copolymer and more than or equal to 60% by mass and less than or equal to 95% by mass of a rubber component of at least one kind selected from the group consisting of natural rubber, isoprene rubber, and butyl rubber, and more than or equal to 0.1 part by mass and less than or equal to 5 parts by mass of sulfur with respect to 100 parts by mass of the polymer component; and a second layer composed of a thermoplastic elastomer composition containing a thermoplastic elastomer, and more than or equal to 0.1 part by mass and less than or equal to 5 parts by mass of sulfur with respect to 100 parts by mass of the thermoplastic elastomer.

Preferably, in the polymer laminate for an inner liner of the present invention, the polymer composition further contains, with respect to 100 parts by mass of the polymer component, more than or equal to 1 part by mass and less than or equal to 5 parts by mass of stearic acid, more than or equal to 0.1 part by mass and less than or equal to 8 parts by mass of zinc oxide, more than or equal to 0.1 part by mass and less than or equal to 5 parts by mass of an antioxidant, and more than or equal to 0.1 part by mass and less than or equal to 5 parts by mass of a vulcanization accelerator.

Preferably, in the polymer laminate for an inner liner of the present invention, the thermoplastic elastomer is of at least one kind selected from the group consisting of: a styrene-isoprene-styrene triblock copolymer; a styrene-isobutylene diblock copolymer; a styrene-butadiene-styrene triblock copolymer; a styrene-isoprene.butadiene-styrene triblock copolymer; a styrene-ethylene.butene-styrene triblock copolymer; a styrene-ethylene.propylene-styrene triblock copolymer; a styrene-ethylene.ethylene.propylene-styrene triblock copolymer; a styrene-butadiene.butylene-styrene triblock copolymer; and their epoxy-modified thermoplastic elastomers.

Preferably, in the polymer laminate for an inner liner of the present invention, the second layer includes at least one of an SIS layer with the thermoplastic elastomer composed of a styrene-isoprene-styrene triblock copolymer, an SIB layer with the thermoplastic elastomer composed of a styrene-isobutylene diblock copolymer, and an epoxidized SBS layer with the thermoplastic elastomer composed of an epoxidized styrene-butadiene-styrene triblock copolymer.

Preferably, in the polymer laminate for an inner liner of the present invention, the thermoplastic elastomer composition further contains, with respect to 100 parts by mass of the thermoplastic elastomer, more than or equal to 1 part by mass and less than or equal to 5 parts by mass of stearic acid, more than or equal to 0.1 part by mass and less than or equal to 8 parts by mass of zinc oxide, more than or equal to 0.1 part by mass and less than or equal to 5 parts by mass of an antioxidant, and more than or equal to 0.1 part by mass and less than or equal to 5 parts by mass of a vulcanization accelerator.

Preferably, in the polymer laminate for an inner liner of the present invention, the styrene-isobutylene-styrene triblock copolymer has a weight-average molecular weight more than or equal to 50,000 and less than or equal to 400,000 and a styrene unit content more than or equal to 10% by mass and less than or equal to 30% by mass.

Preferably, in the polymer laminate for an inner liner of the present invention, the styrene-isoprene-styrene triblock copolymer has a weight-average molecular weight more than or equal to 100,000 and less than or equal to 290,000 and a styrene unit content more than or equal to 10% by mass and less than or equal to 30% by mass.

Preferably, in the polymer laminate for an inner liner of the present invention, the styrene-isobutylene diblock copolymer is linear and has a weight-average molecular weight more than or equal to 40,000 and less than or equal to 120,000 and a styrene unit content more than or equal to 10% by mass and less than or equal to 35% by mass.

Preferably, in the polymer laminate for an inner liner of the present invention, the epoxidized styrene-butadiene-styrene triblock copolymer has a weight-average molecular weight more than or equal to 10,000 and less than or equal to 400,000, a styrene unit content more than or equal to 10% by mass and less than or equal to 30% by mass, and an epoxy equivalent more than or equal to 50 and less than or equal to 1,000.

Preferably, in the polymer laminate for an inner liner of the present invention, the second layer further contains a rubber component of at least one kind selected from the group consisting of natural rubber, isoprene rubber, and butyl rubber, in addition to the thermoplastic elastomer composition, the rubber component being more than or equal to 20% by mass and less than or equal to 90% by mass with respect to a total of the thermoplastic elastomer composition and the rubber component.

The present invention is also directed to a pneumatic tire, wherein the polymer sheet for an inner liner is used for an inner liner part.

The present invention is also directed to a pneumatic tire, wherein the polymer laminate for an inner liner is used for an inner liner part.

The present invention can provide a polymer sheet for an inner liner and a polymer laminate for an inner liner both having sufficient tackiness before vulcanization and vulcanization adhesiveness with a member adjacent to the inner liner and excellent air permeation resistance, as well as a pneumatic tire using them.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<Pneumatic Tire>

Figure 1:
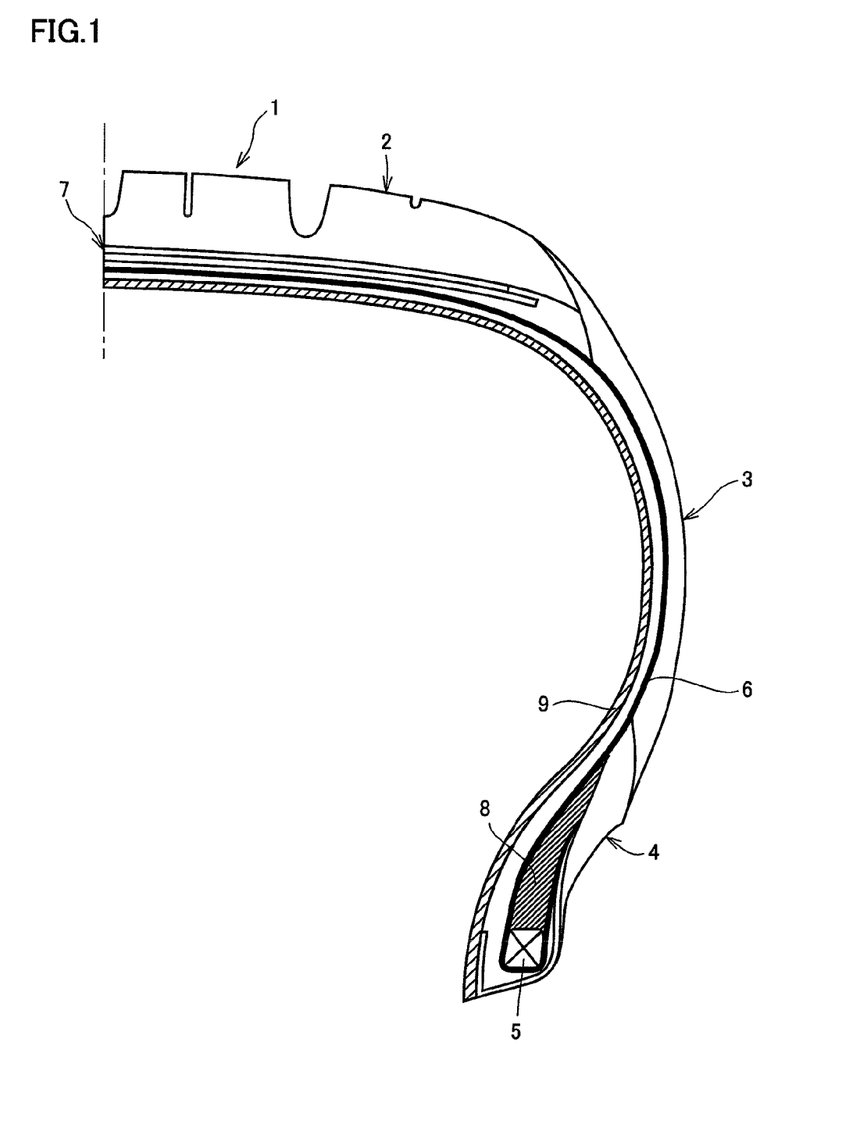
FIG. 1 is a schematic sectional view showing the right half of a pneumatic tire in accordance with one embodiment of the present invention.

A structure of a pneumatic tire of one embodiment of the present invention will be described with reference to FIG. 1.

A pneumatic tire 1 can be used as tires for passenger cars, trucks and buses, and heavy-duty equipment. Pneumatic tire 1 includes a tread part 2, a sidewall part 3 and a bead part 4. Further, a bead core 5 is embedded in bead part 4. Also provided are a carcass 6 arranged to extend from one bead part 4 to the other bead part with each of opposite ends being folded back to latch bead core 5, and a belt layer 7 composed of two plies outside a crown part of carcass 6. An inner liner 9 extending from one bead part 4 to the other bead part 4 is disposed on the tire radial inner side of carcass 6. The two plies of belt layer 7, each being made of a steel cord or a cord of aramid fiber or the like, are arranged so that the cords intersect with each other and each form an angle of usually 5 to 30° with respect to a tire circumferential direction. Regarding the carcass, organic fiber cords made of polyester, nylon, aramid or the like are arranged at an angle of about 90° with respect to the tire circumferential direction, and a bead apex 8 extending from the top of bead core 5 toward the sidewall is disposed in a region surrounded by the carcass and the folded part thereof. It is to be noted that an insulation may be disposed between inner liner 9 and carcass 6.

In one embodiment of the present invention, inner liner 9 is made of a polymer sheet for an inner liner or a polymer laminate for an inner liner.

<Polymer Sheet for Inner Liner>

First Embodiment

Figure 2:
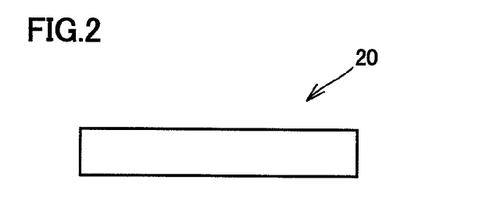
FIG. 2 is a schematic sectional view showing a polymer sheet for an inner liner in accordance with one embodiment of the present invention.

A structure of a polymer sheet for an inner liner of a first embodiment will be described with reference to FIG. 2.

A polymer sheet 20 for an inner liner is composed of a polymer composition including: a polymer component containing more than or equal to 5% by mass and less than or equal to 40% by mass of a styrene-isobutylene-styrene triblock copolymer (hereinafter also referred to as SIBS) and more than or equal to 60% by mass and less than or equal to 95% by mass of a rubber component of at least one kind selected from the group consisting of natural rubber, isoprene rubber, and butyl rubber; and more than or equal to 0.1 part by mass and less than or equal to 5 parts by mass of sulfur with respect to 100 parts by mass of the polymer component.

The thickness of polymer sheet 20 for an inner liner is preferably more than or equal to 0.05 mm and less than or equal to 0.6 mm. When the thickness of the polymer sheet for an inner liner is less than 0.05 mm, the polymer sheet may be broken by a pressing pressure during vulcanization of a green tire in which the polymer sheet is used as the inner liner, and thus an air leak phenomenon may occur in the resultant tire. In contrast, when the thickness of the polymer sheet for an inner liner is more than 0.6 mm, tire weight increases and fuel efficiency deteriorates. The thickness of the polymer sheet for an inner liner is more preferably more than or equal to 0.05 mm and less than or equal to 0.4 mm.

(Polymer Composition)

The polymer composition contains an SIBS, a rubber component, and sulfur. When a rubber component and sulfur are added to the SIBS and mixed by heating, the rubber component and sulfur produce a vulcanization reaction during mixing by heating to form a sea-island structure in which the SIBS serves as a matrix (sea), and the rubber component serves as an island.

The polymer composition having the sea-island structure has air permeation resistance originating in the matrix phase composed of the SIBS. Further, the rubber component constituting the island phase has tackiness before vulcanization with an adjacent member containing a rubber component and vulcanization adhesiveness with the adjacent member because of the vulcanization reaction produced with the rubber component of the adjacent member during mixing by heating. Therefore, the polymer sheet composed of the polymer composition can have excellent air permeation resistance, and have tackiness before vulcanization and vulcanization adhesiveness with the adjacent member.

(Styrene-Isobutylene-Styrene Triblock Copolymer)

Because of an isobutylene block of an SIBS, a polymer sheet containing the SIBS has excellent air permeation resistance. Therefore, when a polymer sheet containing an SIBS is used as an inner liner, a pneumatic tire having excellent air permeation resistance can be obtained.

Further, the SIBS has excellent durability since a molecular structure other than those of aromatic molecules is completely saturated and therefore deterioration and hardening are suppressed. Therefore, when a polymer sheet containing the SIBS is used as the inner liner, a pneumatic tire having excellent durability can be obtained.

When a pneumatic tire is produced by using a polymer sheet containing the SIBS as the inner liner, a halogenated rubber having high specific gravity, which has hitherto been used so as to impart air permeation resistance, such as a halogenated butyl rubber, is not used since air permeation resistance is ensured by the addition of the SIBS. Even if the halogenated rubber is used, the amount of use can be reduced. This enables weight saving of the tire and achieves the effect of improving fuel efficiency.

Although there is no particular limitation on the molecular weight of the SIBS, the weight-average molecular weight obtained by a GPC measurement is preferably more than or equal to 50,000 and less than or equal to 400,000 in view of fluidity, the molding step and rubber elasticity. When the weight-average molecular weight is less than 50,000, tensile strength and tensile elongation may decrease. When the weight-average molecular weight is more than 400,000, extrusion moldability may deteriorate. Therefore, both the cases are not preferred.

The SIBS usually contains more than or equal to 10% by mass and less than or equal to 40% by mass of a styrene unit. Since air permeation resistance and durability become more satisfactory, the content of the styrene unit in the SIBS is preferably more than or equal to 10% by mass and less than or equal to 30% by mass.

In the SIBS, a molar ratio of an isobutylene unit to a styrene unit (isobutylene unit/styrene unit) is preferably from 40/60 to 95/5 in view of the rubber elasticity of the copolymer. In the SIBS, the polymerization degree of each block is preferably from about 10,000 to 150,000 for an isobutylene block, and preferably from about 5,000 to 30,000 for a styrene block, in view of the rubber elasticity and handling (a polymer of a polymerization degree less than 10,000 is a liquid).

The SIBS can be obtained by a conventional polymerization method of a vinyl-based compound and, for example, can be obtained by a living cationic polymerization method.

Japanese Patent Laying-Open No. 62-048704 and Japanese Patent Laying-Open No. 64-062308 disclose that living cationic polymerization of isobutylene with other vinyl compounds can be performed and a polyisobutylene-based block copolymer can be produced by using isobutylene and other compounds as the vinyl compound. In addition, the method for production of a vinyl compound polymer by a living cationic polymerization method is described, for example, in U.S. Pat. No. 4,946,899, U.S. Pat. No. 5,219,948 and Japanese Patent Laying-Open No. 03-174403.

The SIBS does not have a double bond other than an aromatic double bond in the molecule and therefore has higher stability to ultraviolet rays than a polymer having a double bond in the molecule, such as polybutadiene, resulting in satisfactory weatherability.

The SIBS content is more than or equal to 5% by mass and less than or equal to 40% by mass of a polymer component in the polymer composition. When the SIBS content is less than 5% by mass, air permeation resistance of the polymer sheet may be reduced. When the SIBS content is more than 40% by mass, vulcanization adhesiveness with an adjacent member may be insufficient. The SIBS content is preferably more than or equal to 10% by mass and less than or equal to 30% by mass of the polymer component from the viewpoint of ensuring air permeation resistance.

(Rubber Component)

In the first embodiment, the polymer composition constituting the polymer sheet for an inner liner contains a rubber component. The rubber component can provide the polymer composition with tackiness before vulcanization with an adjacent member containing a rubber component. Further, because of the vulcanization reaction with sulfur, the rubber component can provide the polymer composition with vulcanization adhesiveness with an adjacent member such as a carcass or an insulation.

The rubber component contains at least one kind selected from the group consisting of natural rubber, isoprene rubber, and butyl rubber, and it is particularly preferable to contain natural rubber from the viewpoint of breaking strength and adhesiveness.

The content of the rubber component is more than or equal to 60% by mass and less than or equal to 95% by mass of the polymer component in the polymer composition. When the content of the rubber component is less than 60% by mass, the viscosity of the polymer composition increases to cause extrusion moldability to deteriorate, so that when producing a polymer sheet, the polymer sheet cannot be made thin. When the content of the rubber component is more than 95% by mass, air permeation resistance of the polymer sheet may be reduced. The content of the rubber component is preferably more than or equal to 70% by mass and less than or equal to 90% by mass of the polymer component from the viewpoint of tackiness before vulcanization and vulcanization adhesiveness.

(Sulfur)

In the first embodiment, the polymer composition constituting the polymer sheet for an inner liner contains sulfur.

As sulfur, sulfur generally used in the rubber industry for vulcanization can be used. It is particularly preferable to use insoluble sulfur. As used herein, insoluble sulfur refers to sulfur obtained by heating and rapidly cooling natural sulfur $S_8$, and polymerizing it so as to become Sx (x=100,000 to 300,000). The use of insoluble sulfur can prevent blooming that would usually occur when sulfur is used as a rubber vulcanization agent.

The sulfur content is more than or equal to 0.1 part by mass and less than or equal to 5 parts by mass with respect to 100 parts by mass of the polymer component. When the sulfur content is less than 0.1 part by mass, the vulcanization effect of the rubber component cannot be achieved. When the sulfur content is more than 5 parts by mass, the hardness of the polymer composition increases, and when the polymer sheet is used as an inner liner, the durability of a pneumatic tire may deteriorate. The sulfur content is preferably more than or equal to 0.3 part by mass and less than or equal to 3.0 parts by mass.

(Additive in Polymer Composition)

In the first embodiment, the polymer composition constituting the polymer sheet for an inner liner can contain additives such as stearic acid, zinc oxide, an antioxidant, and a vulcanization accelerator.

Stearic acid functions as a vulcanization assistant for the rubber component. The content of stearic acid is preferably more than or equal to 1 part by mass and less than or equal to 5 parts by mass with respect to 100 parts by mass of the polymer component. When the content of stearic acid is less than 1 part by mass, the effect as a vulcanization assistant cannot be achieved. When the content of stearic acid is more than 5 parts by mass, the viscosity of the polymer composition may be reduced, and the breaking strength may be reduced, which is not preferable. Therefore, both the cases are not preferred. The content of stearic acid is more preferably more than or equal to 1 part by mass and less than or equal to 4 parts by mass.

Zinc oxide functions as a vulcanization assistant of the rubber component. The content of zinc oxide is preferably more than or equal to 0.1 part by mass and less than or equal to 8 parts by mass with respect to 100 parts by mass of the polymer component. When the content of zinc oxide is less than 0.1 part by mass, the effect as a vulcanization assistant cannot be achieved. When the content of zinc oxide is more than 8 parts by mass, the hardness of the polymer composition increases, and when the polymer sheet is used as the inner liner, the durability of a pneumatic tire may deteriorate. The content of zinc oxide is preferably more than or equal to 0.5 part by mass and less than or equal to 6 parts by mass.

An antioxidant has the function of preventing a series of degradations called aging, such as oxidation degradation, thermal degradation, ozone degradation, and fatigue degradation. Antioxidants are classified into a primary antioxidant composed of amines or phenols and a secondary antioxidant composed of sulfur compounds or phosphites. The primary antioxidant has the function of supplying hydrogen to various polymer radicals to stop a chain reaction of autooxidation, and the secondary antioxidant exhibits a stabilizing effect by turning hydroxyperoxide into stable alcohol.

The antioxidant includes amines, phenols, imidazoles, phosphors, thioureas, and the like.

Amines include phenyl-α-naphthylamine, 2,2,4-trimethyl-1,2-dihydroquinoline polymer, 6-ethoxy-2,2,4-trimethyl-1,2-dihydroquinoline, p,p'-dioctyldiphenylamine, p,p'-dicumyldiphenylamine, N,N'-di-2-naphthyl-p-phenylenediamine, N,N'-diphenyl-p-phenylenediamine, N-phenyl-N'-isopropyl-p-phenylenediamine, N-phenyl-N'-1,3-dimethylbutyl-p-phenylenediamine, N-(1,3-dimethylbutyl)-N'-phenyl-p-phenylenediamine, and the like.

Phenols include 2,6-di-tert-butyl-4-methylphenol, 2,6-di-tert-butyl-4-methylphenol, styrenated methylphenol, 2,2'-methylene bis(4-ethyl-6-tert-butylphenol), 2,2'-methylene bis(4-methyl-6-tert-butylphenol), 4,4'-butylidenebis(3-methyl-6-tert-butylphenol), 4,4'-thiobis(3-methyl-6-tert-butylphenol), 2,5-di-tert-butyl-hydroquinone, 2,5-di-tert-amyl hydroquinone, and the like.

Imidazoles include 2-mercaptobenzimidazole, zinc salt of 2-mercaptobenzimidazole, nickel dibutyldithiocarbamate, and the like.

In addition, phosphors such as tris(nonylphenyl)phosphite, thioureas such as 1,3-bis(dimethylaminopropyl)-2-thiourea and tributyl thiourea, an antiozonant wax, and the like may be used.

One kind of the above-mentioned antioxidants may be used solely, or two or more kinds may be used in combination. Particularly, it is preferable to use N-(1,3-dimethylbutyl)-N'-phenyl-p-phenylenediamine.

The antioxidant content is preferably more than or equal to 0.1 part by mass and less than or equal to 5 parts by mass with respect to 100 parts by mass of the polymer component. When the antioxidant content is less than 0.1 part by mass, the antioxidant effect cannot be achieved. When the antioxidant content is more than 5 parts by mass, the blooming phenomenon will occur in the polymer composition. The antioxidant content is more preferably more than or equal to 0.3 part by mass and less than or equal to 4 parts by mass.

As the vulcanization accelerator, thiurams, thiazoles, thioureas, dithiocarbamates, guanidines, sulfenamides, and the like can be used.

Thiurams include tetramethylthiuram monosulfide, tetramethylthiuram disulfide, tetraethylthiuram disulfide, tetrabutylthiuram disulfide, dipentamethylenethiuram tetrasulfide, and the like.

Thiazoles include 2-mercaptobenzothiazole, dibenzothiazyl disulfide, N-cyclohexylbenzothiazole, N-cyclohexyl-2-benzothiazole sulfenamide, N-oxydiethylene-2-benzothiazole sulfenamide, N-tert-butyl-2-benzothiazole sulfenamide, N,N-dicyclohexyl-2-benzothiazole sulfenamide, N-tert-butyl-2-benzothiazolylsulfenamide, and the like.

Thioureas include N,N'-diethylthiourea, ethylenethiourea, trimethylthiourea, and the like.

Dithiocarbamates include zinc dimethyldithiocarbamate, zinc diethyldithiocarbamate, zinc dibutyldithiocarbamate, sodium dimethyldithiocarbamate, sodium diethyldithiocarbamate, copper dimethyldithiocarbamate, iron (III) diethyldithiocarbamate, selenium diethyldithiocarbamate, tellurium diethyldithiocarbamate, and the like.

Guanidines include di-o-tolylguanidine, 1,3-diphenylguanidine, 1-o-tolylbiguanide, di-o-tolylguanidine salt of dicatecholborate, and the like.

Sulfenamides include N-cyclohexyl-2-benzothiazyl sulfenamide, and the like.

One kind of the above-mentioned vulcanization accelerators may be used solely, or two or more kinds may be used in combination. Particularly, it is preferable to use dibenzothiazyl disulfide.

The content of the vulcanization accelerator is preferably more than or equal to 0.1 part by mass and less than or equal to 5 parts by mass with respect to 100 parts by mass of the polymer component. When the content of the vulcanization accelerator is less than 0.1 part by mass, the vulcanization acceleration effect cannot be achieved. When the content of the vulcanization accelerator is more than 5 parts by mass, the hardness of the polymer composition increases, and when the polymer sheet is used as an inner liner, the durability of a pneumatic tire may deteriorate. In addition, the raw material cost increases. The content of the vulcanization accelerator is more preferably more than or equal to 0.3 part by mass and less than or equal to 4 parts by mass.

(Production Method of Polymer Sheet for Inner Liner)

In the first embodiment, the polymer sheet for an inner liner can be produced by the following method, for example. The respective ingredients are charged into a twin-screw extruder and kneaded under the conditions of about 150 to 280° C. and 50 to 300 rpm, thereby obtaining a pellet of a polymer composition in which the SIBS, the rubber component, sulfur, and various additives according to necessity being dynamically crosslinked. The obtained pellet is charged into a T-die extruder to obtain a polymer sheet of desired thickness.

In the twin-screw extruder, the SIBS, which is a thermoplastic elastomer, serves as the matrix phase, and the rubber component serves as the island phase and is dispersed. Further, in the twin-screw extruder, the rubber component reacts with the additive component, and the rubber component serving as the island phase produces a crosslinking reaction. Since the rubber component is dynamically crosslinked in the twin-screw extruder, it is called dynamic crosslinking. Even if the rubber component is dynamically crosslinked in the twin-screw extruder, the shear viscosity of the whole system is low and extrusion molding is possible since the matrix phase of the system is composed of the thermoplastic elastomer component.

In the pellet of the dynamically-crosslinked polymer composition obtained with the twin-screw extruder, the rubber component is crosslinked, however, the thermoplastic elastomer component of the matrix phase holds plasticity, and serves to produce plasticity of the polymer composition. Therefore, the polymer composition also exhibits plasticity in the T-die extruder, and thus can be molded into a sheet shape.

Further, since the rubber component is crosslinked in the pellet of the dynamically-crosslinked polymer composition, the polymer composition of the inner liner can be prevented from penetrating into the carcass layer even when a pneumatic tire is heated while manufacturing the pneumatic tire by using the polymer sheet produced from this pellet as the inner liner.

<Polymer Laminate for Inner Liner>

Second Embodiment

Figures 3, 4:
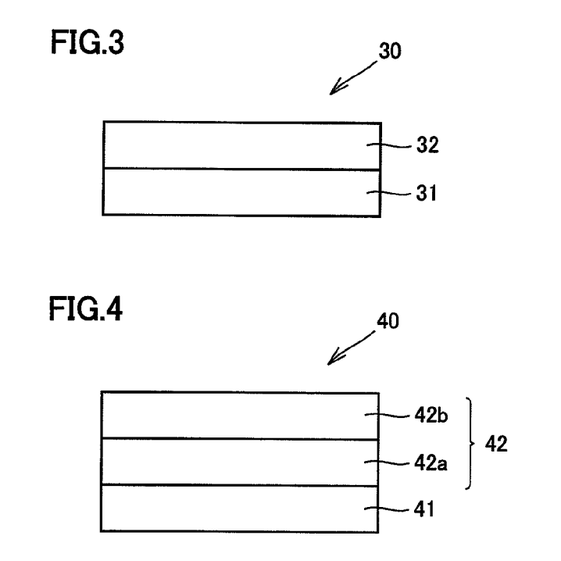
FIGS. 3 and 4 are schematic sectional views each showing a polymer laminate for an inner liner in accordance with one embodiment of the present invention.

A structure of a polymer laminate for an inner liner of a second embodiment will be described with reference to FIG. 3.

A polymer laminate 30 for an inner liner includes a first layer 31 composed of a polymer composition including a polymer component containing more than or equal to 5% by mass and less than or equal to 40% by mass of a styrene-isobutylene-styrene triblock copolymer and more than or equal to 60% by mass and less than or equal to 95% by mass of a rubber component of at least one kind selected from the group consisting of natural rubber, isoprene rubber, and butyl rubber, and more than or equal to 0.1 part by mass and less than or equal to 5 parts by mass of sulfur with respect to 100 parts by mass of the polymer component, and a second layer 32 composed of a thermoplastic elastomer composition containing a thermoplastic elastomer and more than or equal to 0.1 part by mass and less than or equal to 5 parts by mass of sulfur with respect to 100 parts by mass of the thermoplastic elastomer.

The thickness of polymer laminate 30 for an inner liner is preferably more than or equal to 0.05 mm and less than or equal to 0.6 mm. When the thickness of the polymer laminate for an inner liner is less than 0.05 mm, the polymer laminate may be broken by a pressing pressure during vulcanization of a green tire in which the polymer laminate is used as the inner liner, and thus an air leak phenomenon may occur in the resultant tire. In contrast, when the thickness of the polymer laminate for an inner liner is more than 0.6 mm, tire weight increases and fuel efficiency deteriorates. The thickness of the polymer laminate for an inner liner is more preferably more than or equal to 0.05 mm and less than or equal to 0.4 mm. Further, the thickness of the first layer is preferably more than or equal to 0.1 mm and less than or equal to 0.59 mm, and the thickness of the second layer is preferably more than or equal to 0.01 mm and less than or equal to 0.2 mm.

(First Layer)

In the second embodiment, the first layer of the polymer laminate for an inner liner can be embodied by one similar to the polymer sheet for an inner liner of the first embodiment.

(Second Layer)

In the second embodiment, the second layer is composed of the thermoplastic elastomer composition containing a thermoplastic elastomer and sulfur. In addition to the thermoplastic elastomer composition, such second layer may further contain a rubber component of at least one kind selected from the group consisting of natural rubber, isoprene rubber, and butyl rubber. Such rubber component will be described later in detail.

(Thermoplastic Elastomer Composition)

The thermoplastic elastomer composition contains a thermoplastic elastomer and sulfur. By adding sulfur to the thermoplastic elastomer, tackiness before vulcanization and vulcanization adhesiveness with the first layer is improved. Further, tackiness before vulcanization and vulcanization adhesiveness with an adjacent member, such as a carcass or an insulation, is also improved.

(Thermoplastic Elastomer)

As the thermoplastic elastomer, at least one kind selected from the group consisting of: a styrene-isoprene-styrene triblock copolymer; a styrene-isobutylene diblock copolymer; a styrene-butadiene-styrene triblock copolymer; a styrene-isoprene.butadiene-styrene triblock copolymer; a styrene-ethylene.butene-styrene triblock copolymer; a styrene-ethylene.propylene-styrene triblock copolymer; a styrene-ethylene.ethylene.propylene-styrene triblock copolymer; and a styrene-butadiene.butylene-styrene triblock copolymer can be used. It is to be noted that these thermoplastic elastomers may be epoxy-modified thermoplastic elastomers having an epoxy group. Particularly, it is preferable to use a styrene-isoprene-styrene triblock copolymer, styrene-isobutylene diblock copolymer, or an epoxidized styrene-butadiene-styrene triblock copolymer. Hereinafter, the styrene-isoprene-styrene triblock copolymer, the styrene-isobutylene diblock copolymer, and the epoxidized styrene-butadiene-styrene triblock copolymer will be described.

(Styrene-Isoprene-Styrene Triblock Copolymer)

Since an isoprene block of a styrene-isoprene-styrene triblock copolymer (hereinafter also referred to as SIS) is a soft segment, a thermoplastic elastomer composition containing the SIS is easily vulcanization-bonded with a rubber component. Therefore, when the thermoplastic elastomer composition containing the SIS is used for the polymer laminate for an inner liner, the polymer laminate is excellent in adhesiveness with an adjacent rubber constituting a carcass or an insulation, for example, and thus a pneumatic tire that can avoid the air-in phenomenon and present excellent durability can be obtained.

Although there is no particular limitation on the molecular weight of the SIS, the weight-average molecular weight obtained by the GPC measurement is preferably more than or equal to 100,000 and less than or equal to 290,000 in view of rubber elasticity and moldability. When the weight-average molecular weight is less than 100,000, tensile strength may decrease. When the weight-average molecular weight is more than 290,000, extrusion moldability may deteriorate. Therefore, both the cases are not preferred.

The content of a styrene unit in the SIS is preferably more than or equal to 10% by mass and less than or equal to 30% by mass in view of tackiness, adhesiveness and rubber elasticity.

In the SIS, a molar ratio of an isoprene unit to a styrene unit (isoprene unit/styrene unit) is preferably from 90/10 to 70/30. In the SIS, the polymerization degree of each block is preferably from about 500 to 5,000 for an isoprene block, and preferably from about 50 to 1,500 for a styrene block, in view of the rubber elasticity and handling.

The SIS can be obtained by a conventional polymerization method of a vinyl-based compound and, for example, can be obtained by a living cationic polymerization method.

The second layer containing the SIS can be obtained by mixing the SIS, sulfur and other additives by a Banbury mixer, and then forming the mixture into a sheet by a conventional method of forming a thermoplastic resin or a thermoplastic elastomer into a sheet, such as extrusion molding or calender molding.

(Styrene-Isobutylene Diblock Copolymer)

Since an isobutylene block of a styrene-isobutylene diblock copolymer (hereinafter also referred to as SIB) is a soft segment, a thermoplastic elastomer composition containing the SIB is easily vulcanization-bonded with a rubber component. Therefore, when the thermoplastic elastomer composition containing the SIB is used for the polymer laminate for an inner liner, the inner liner is excellent in adhesiveness with an adjacent rubber constituting a carcass or an insulation, for example, and thus a pneumatic tire that can avoid the air-in phenomenon and present excellent durability can be obtained.

It is preferred to use one having a linear molecular chain as the SIB in view of rubber elasticity and adhesiveness.

Although there is no particular limitation on the molecular weight of the SIB, the weight-average molecular weight obtained by the GPC measurement is preferably more than or equal to 40,000 and less than or equal to 120,000 in view of rubber elasticity and moldability. When the weight-average molecular weight is less than 40,000, tensile strength may decrease. When the weight-average molecular weight is more than 120,000, extrusion moldability may deteriorate. Therefore, both the cases are not preferred.

The content of a styrene unit in the SIB is preferably more than or equal to 10% by mass and less than or equal to 35% by mass in view of tackiness, adhesiveness and rubber elasticity.

In the SIB, a molar ratio of an isobutylene unit to a styrene unit (isobutylene unit/styrene unit) is preferably from 90/10 to 65/35. In the SIB, the polymerization degree of each block is preferably from about 300 to 3,000 for an isobutylene block, and preferably from about 10 to 1,500 for a styrene block, in view of rubber elasticity and handling.

The SIB can be obtained by a conventional polymerization method of a vinyl-based compound and, for example, can be obtained by a living cationic polymerization method.

International Publication No. WO 2005/033035 discloses a production method in which methylcyclohexane, n-butyl chloride and cumyl chloride are charged into a stirrer, cooled to −70° C. and reacted for 2 hours, and then the reaction is terminated by adding a large amount of methanol and the reaction product is vacuum-dried at 60° C. to obtain an SIB.

The second layer containing the SIB can be obtained by mixing the SIB, sulfur and other additives by a Banbury mixer, and then forming the mixture into a sheet by a conventional method of forming a thermoplastic resin or a thermoplastic elastomer into a sheet, such as extrusion molding or calender molding.

(Epoxidized Styrene-Butadiene-Styrene Triblock Copolymer)

An epoxidized styrene-butadiene-styrene triblock copolymer (hereinafter also referred to as epoxidized SBS) is a thermoplastic elastomer in which a hard segment is a polystyrene block, a soft segment is a butadiene block, and an unsaturated double bond portion contained in the butadiene block has been epoxidized. Since the epoxidized SBS has the soft segment, a thermoplastic elastomer composition containing the epoxidized SBS is easily vulcanization-bonded with a rubber component. Therefore, when thermoplastic elastomer composition containing the epoxidized SBS is used for the polymer laminate for an inner liner, the polymer laminate is excellent in adhesiveness with an adjacent rubber constituting a carcass or an insulation, for example, and thus a pneumatic tire that can avoid the air-in phenomenon and present excellent durability can be obtained.

Although there is no particular limitation on the molecular weight of the epoxidized SBS, the weight-average molecular weight obtained by the GPC measurement is preferably more than or equal to 10,000 and less than or equal to 400,000 in view of rubber elasticity and moldability. When the weight-average molecular weight is less than 10,000, the reinforcing effect may be lessened. When the weight-average molecular weight is more than 400,000, the thermoplastic elastomer composition may be increased in viscosity. Therefore, both the cases are not preferred.

The content of a styrene unit in the epoxidized SBS is preferably more than or equal to 10% by mass and less than or equal to 30% by mass in view of tackiness, adhesiveness and rubber elasticity.

In the epoxidized SBS, a molar ratio of a butadiene unit to a styrene unit (butadiene unit/styrene unit) is preferably from 90/10 to 70/30. In the epoxidized SBS, the polymerization degree of each block is preferably from about 500 to 5,000 for a butadiene block, and preferably from about 500 to 1,500 for a styrene block, in view of rubber elasticity and handling.

The second layer containing the epoxidized SBS can be obtained by mixing the epoxidized SBS, sulfur and other additives by a Banbury mixer, and then forming the mixture into a sheet by a conventional method of forming a thermoplastic resin or a thermoplastic elastomer into a sheet, such as extrusion molding or calender molding.

(Rubber Component)

When the above-mentioned second layer contains a rubber component, the rubber component is preferably more than or equal to 20% by mass and less than or equal to 90% by mass with respect to the total of the thermoplastic elastomer and the rubber component, and more preferably more than or equal to 30% by mass and less than or equal to 80% by mass. When the rubber component is less than 20% by mass, the second layer may be unlikely to be vulcanization-bonded with the carcass layer, and when the rubber component is more than 90% by mass, the second layer and the carcass layer may be vulcanization-bonded excessively.

(Sulfur)

Sulfur can be embodied by one similar to that of the first embodiment.

The sulfur content is preferably more than or equal to 0.1 part by mass and less than or equal to 5 parts by mass with respect to 100 parts by mass of the thermoplastic elastomer. When the sulfur content is less than 0.1 part by mass, the vulcanization reaction may not be produced. When the sulfur content is more than 5 parts by mass, the crosslinking density of the thermoplastic elastomer composition may be increased, which may increase viscosity. The sulfur content is more preferably more than or equal to 0.3 part by mass and less than or equal to 3 parts by mass.

(Additives in Thermoplastic Elastomer Composition)

In the second embodiment, the thermoplastic elastomer composition constituting the polymer laminate for an inner liner can contain additives such as stearic acid, zinc oxide, an antioxidant, and a vulcanization accelerator. These additives can be embodied by ones similar to those of the first embodiment.

The content of stearic acid is preferably more than or equal to 1 part by mass and less than or equal to 5 parts by mass with respect to 100 parts by mass of the thermoplastic elastomer. When the content of stearic acid is less than 1 part by mass, vulcanization may not occur. When the content of stearic acid is more than 5 parts by mass, the breaking strength of the thermoplastic elastomer composition may deteriorate. The content of stearic acid is more preferably more than or equal to 1 part by mass and less than or equal to 4 parts by mass.

The content of zinc oxide is preferably more than or equal to 0.1 part by mass and less than or equal to 8 parts by mass with respect to 100 parts by mass of the thermoplastic elastomer. When the content of zinc oxide is less than 0.1 part by mass, vulcanization may not occur. When the content of zinc oxide is more than 8 parts by mass, the hardness of the thermoplastic elastomer composition may increase, and the durability may deteriorate. The content of zinc oxide is more preferably more than or equal to 0.5 part by mass and less than or equal to 6 parts by mass.

The antioxidant content is preferably more than or equal to 0.1 part by mass and less than or equal to 5 parts by mass with respect to 100 parts by mass of the thermoplastic elastomer. When the antioxidant content is less than 0.1 part by mass, the antioxidant effect cannot be achieved. When the antioxidant content is more than 5 parts by mass, the blooming phenomenon may occur. The antioxidant content is more preferably more than or equal to 0.3 part by mass and less than or equal to 4 parts by mass.

The content of the vulcanization accelerator is preferably more than or equal to 0.1 part by mass and less than or equal to 5 parts by mass with respect to 100 parts by mass of the thermoplastic elastomer. When the content of the vulcanization accelerator is less than 0.1 part by mass, the vulcanization acceleration effect may not be achieved. When the content of the vulcanization accelerator is more than 5 parts by mass, the hardness of the thermoplastic elastomer composition may increase, and the durability may deteriorate. In addition, the raw material cost increases. The content of the vulcanization accelerator is more preferably more than or equal to 0.3 part by mass and less than or equal to 4 parts by mass.

(Production Method of Polymer Laminate for Inner Liner)

In the second embodiment, the polymer laminate for an inner liner can be produced by the following method, for example. The first layer is produced similarly to the method of production of the polymer sheet for an inner liner of the first embodiment. The second layer is produced by forming the thermoplastic elastomer composition into a sheet by extrusion molding, calender molding or the like. The first layer and the second layer are bonded together to produce a polymer laminate. Alternatively, the respective pellets of the polymer composition and the thermoplastic elastomer composition can be subjected to lamination extrusion such as laminate extrusion or coextrusion to obtain a polymer laminate.

Third Embodiment

A structure of a polymer laminate for an inner liner of a third embodiment will be described with reference to FIG. 4.

A polymer laminate 40 for an inner liner includes a first layer 41 composed of a polymer composition containing a polymer component and sulfur, and a second layer 42 composed of a thermoplastic elastomer composition containing a thermoplastic elastomer and sulfur. Second layer 42 includes a second A layer 42a and a second B layer 42b composed of different kinds of thermoplastic elastomer compositions, respectively.

The thickness of polymer laminate 40 for an inner liner is preferably more than or equal to 0.05 mm and less than or equal to 0.6 mm. When the thickness of the polymer laminate for an inner liner is less than 0.05 mm, the polymer laminate may be broken by a pressing pressure during vulcanization of a green tire in which the polymer laminate is used as the inner liner, and thus an air leak phenomenon may occur in the resultant tire. In contrast, when the thickness of the polymer laminate for an inner liner is more than 0.6 mm, tire weight increases and fuel efficiency deteriorates. The thickness of the polymer laminate for an inner liner is more preferably more than or equal to 0.05 mm and less than or equal to 0.4 mm. Further, the thickness of the first layer is preferably more than or equal to 0.1 mm and less than or equal to 0.59 mm, the thickness of the second A layer is preferably more than or equal to 0.01 mm and less than or equal to 0.2 mm, and the thickness of the second B layer is preferably more than or equal to 0.01 mm and less than or equal to 0.2 mm.

It is to be noted that, in the third embodiment, second layer 42 includes two layers of second A layer 42a and second B layer 42b, however, second layer 42 may include three or more layers composed of thermoplastic elastomer compositions.

(First Layer)

In the second embodiment, the first layer of the polymer laminate for an inner liner can be embodied by one similar to the polymer sheet for an inner liner of the first embodiment.

(Second Layer)

In the third embodiment, second A layer 42a and second B layer 42b constituting second layer 42 are respectively selected from among an SIS layer with a thermoplastic elastomer composed of a styrene-isoprene-styrene triblock copolymer, an SIB layer with a thermoplastic elastomer composed of a styrene-isobutylene diblock copolymer, and an epoxidized SBS layer with a thermoplastic elastomer composed of an epoxidized styrene-butadiene-styrene triblock copolymer. It is particularly preferable to use the SIS layer as second A layer 42a and the epoxidized SBS layer as second B layer 42b.

The styrene-isoprene-styrene triblock copolymer, the styrene-isobutylene diblock copolymer, the epoxidized styrene-butadiene-styrene triblock copolymer, and sulfur can be embodied by ones similar to those of the second embodiment.

The thermoplastic elastomer composition can contain additives such as stearic acid, zinc oxide, an antioxidant, and a vulcanization accelerator. These additives can be embodied by ones similar to those of the first embodiment. These additives can have contents similar to those of the second embodiment.

(Method for Producing Polymer Laminate for Inner Liner)

In the third embodiment, the polymer laminate for an inner liner can be produced by a method similar to that of the second embodiment.

<Method for Producing Pneumatic Tire>

A pneumatic tire of one embodiment of the present invention can be produced by the following method, for example.

A green tire in which the polymer sheet for an inner liner or the polymer laminate for an inner liner of the present invention is used for the inner liner part is prepared. In the case of using the polymer laminate for an inner liner, the polymer laminate is arranged toward the tire radial outer side such that the second layer contacts the carcass or the insulation. With such an arrangement, the second layer can be vulcanization-bonded with an adjacent member such as the carcass or the insulation in a tire vulcanization step. Therefore, the resultant pneumatic tire can have excellent air permeation resistance and durability since the inner liner is satisfactorily bonded with the adjacent member.

Then, the green tire is mounted in a mold for heating with pressurization at 150 to 180° C. for 3 to 50 minutes by a bladder to obtain a vulcanized tire. The obtained vulcanized tire is preferably cooled at 50 to 120° C. for 10 to 300 seconds.

In the pneumatic tire, the inner liner is implemented by the polymer sheet for an inner liner or the polymer laminate for an inner liner of the present invention. The SIBS, the SIS, the SIB or the epoxidized SBS constituting the polymer sheet or the polymer laminate, which are thermoplastic elastomers, is softened in the mold when heated to 150 to 180° C., for example, in the step of obtaining the vulcanized tire. The softened thermoplastic elastomer has higher reactivity than in the solid state, and is thus fused with an adjacent member. That is, the inner liner in contact with the outside surface of the expanded bladder is softened by heating to be fused with the bladder. When an attempt is made to remove the vulcanized tire from the mold in a state where the inner liner is fused with the outside surface of the bladder, the inner liner peels off the insulation or the carcass adjacent thereto, causing the air-in phenomenon. Further, the tire may be deformed in shape.

Therefore, by quenching the resultant vulcanized tire immediately at 120° C. or lower for 10 or more seconds, the thermoplastic elastomer used for the inner liner can be solidified. When the thermoplastic elastomer is solidified, fusing of the inner liner with the bladder is eliminated, and thus the releasability when removing the vulcanized tire from the mold is improved.

The cooling temperature is preferably from 50 to 120° C. When the cooling temperature is lower than 50° C., it is necessary to prepare a particular cooling medium, which may degrade productivity. When the cooling temperature is higher than 120° C., the thermoplastic elastomer may not be sufficiently cooled, which causes the inner liner to be still fused with the bladder upon opening of the mold, giving rise to the air-in phenomenon. The cooling temperature is more preferably from 70 to 100° C.

The cooling time is preferably from 10 to 300 seconds. When the cooling time is less than 10 seconds, the thermoplastic elastomer may not be sufficiently cooled, which causes the inner liner to be still fused with the bladder upon opening of the mold, giving rise to the air-in phenomenon. When the cooling time is more than 300 seconds, productivity deteriorates. The cooling time is more preferably from 30 to 180 seconds.

The step of cooling the vulcanized tire is preferably performed by cooling inside the bladder. Since a cavity exists inside the bladder, it is possible to introduce a cooling medium controlled to the cooling temperature into the bladder after completion of the vulcanization step.

It is also possible to carry out the step of cooling the vulcanized tire by cooling inside the bladder and also disposing a cooling structure in the mold.

It is preferred to use, as a cooling medium, at least one selected from the group consisting of air, steam, water and oil. Of these, water having excellent cooling efficiency is preferably used.

EXAMPLE

Examples 1 to 4, Comparative Examples 1 to 7

Consideration of First Layer (Production of Polymer Composition)

The respective ingredients in accordance with formulations shown in Table 2 were charged into a twin-screw extruder (screw diameter: φ50 mm; L/D: 30; cylinder temperature: 200° C.), and kneaded at 200 rpm to obtain a pellet. The obtained pellet was subjected to sheeting by an open roll to produce a polymer composition sample having a thickness of 4.0 mm.

(Production of Polymer Sheet)

The respective ingredients in accordance with formulations shown in Table 2 were charged into a twin-screw extruder (screw diameter: φ50 mm; L/D: 30; cylinder temperature: 200° C.), and kneaded at 200 rpm to obtain a pellet. The obtained pellet was charged into a T-die extruder (screw diameter: φ80 mm; L/D: 50; die gap width: 500 mm; cylinder temperature: 220° C., film gauge: 0.3 mm) to produce a polymer sheet having a thickness of 0.3 mm.

(Production of Pneumatic Tire)

The resultant polymer sheet was used for the inner liner part of a tire to prepare a green tire. The green tire was subjected to press molding in a mold at 170° C. for 20 minutes to obtain a vulcanized tire of 195/65R15 size. After cooling the vulcanized tire at 100° C. for 3 minutes, the vulcanized tire was removed from the mold to obtain a pneumatic tire.

Using the obtained polymer composition, the polymer sheet and the pneumatic tire, the following evaluations were performed.

(a) Mooney viscosity

In conformity to JIS K 6300 "Test Method of Unvulcanized Rubber", a Mooney viscosity testing machine "Moony Viscometer SMV-202" available from Shimadzu Corporation was used, and a small rotor was rotated under the temperature condition of 130° C. preheated for 1 minute, then, the Mooney viscosity (ML1+4, 130° C.) of the polymer composition after the lapse of 4 minutes was measured. It shows that the smaller the Mooney viscosity, the more excellent the workability.

(b) Tackiness with Carcass Layer Before Vulcanization

A sheet of a carcass layer (formulation: 100 parts by mass of a styrene-butadiene rubber, 50 parts by mass of carbon black, 2 parts by mass of sulfur, thickness: 2.0 mm) was prepared.

The polymer sheet and the sheet of the carcass layer were bonded together and held at 100 gf for 30 seconds, and the force by which they were separated was measured as tackiness before vulcanization. The tackiness before vulcanization of each formulation was expressed as an index by the following equation using Comparative Example 1 as a reference value 100. It shows that the greater the index of tackiness before vulcanization, the greater the tackiness before vulcanization, which is preferable.

(index of tackiness before vulcanization)=(tackiness before vulcanization of each formulation)/(tackiness before vulcanization of Comparative Example 1)×100.

(c) (Vulcanization Adhesiveness with Carcass Layer)

The polymer sheet and the sheet of the carcass layer were bonded together, and were heated at 170° C. for 20 minutes to obtain a sample for measuring vulcanization adhesiveness (adhesive strength). Peel force was measured in a tensile peel test as vulcanization adhesiveness. The vulcanization adhesiveness of each formulation was expressed as an index by the following equation using Comparative Example 1 as a reference value 100. It shows that the greater the index of vulcanization adhesiveness, the greater the vulcanization adhesiveness, which is preferable.

(index of vulcanization adhesiveness)=(vulcanization adhesiveness of each formulation)/(vulcanization adhesiveness of Comparative Example 1)×100

(d) Weight Saving Effect

The weight of a pneumatic tire with each formulation used was expressed as an index by the following equation using Comparative Example 1 as a reference value 100. It shows that the greater the index of weight saving effect, the lighter the tire weight, which is preferable.

(index of weight saving effect)=(tire weight of Comparative Example 1)/(tire weight of each formulation)×100.

(e) Rolling Resistance

Using a rolling resistance tester manufactured by KOBE STEEL, LTD., the produced pneumatic tire of 195/65R15 size was mounted on a JIS standard rim 15×6JJ, and rolling resistance was measured while driving the tire at room temperatures (38° C.) under the conditions of a load of 3.4 kN, an air pressure of 230 kPa, and a speed of 80 km/hour. The rolling resistance of each formulation was expressed as an index by the following equation using Comparative Example 1 as a reference value 100. It shows that the greater the rolling resistance index, the smaller the rolling resistance, which is preferable.

(rolling resistance index)=(rolling resistance of Comparative Example 1)/(rolling resistance of each formulation)×100

(f) Static Air Pressure Drop Rate

The produced tire of 195/65R15 size was mounted on a JIS standard rim 15×6JJ and an initial air pressure of 300 kPa was applied. The tire was left at room temperatures for 90 days, following which an air pressure drop rate (%/month) was calculated.

Overall Judgment

Criteria for overall judgment are as shown in Table 1.

TABLE 1

| Overall judgment | Judgment criteria | (a) Mooney viscosity | (b) Index of tackiness with carcass layer before vulcanization | (c) Index of vulcanization adhesiveness with carcass layer | (d) Rolling resistance index | (e) Index of weight saving effect | (f) Static air pressure drop rate (%/month) |
|---|---|---|---|---|---|---|---|
| A | All of (a) to (f) satisfy conditions on the right. | 45 or less | 60 or more | 80 or more | 100 or more | 110 or more | 2.5 or less |
| B | Any one of (a) to (f) satisfies a corresponding condition on the right. A lower evaluation is adopted in the case of corresponding to plural judgments. | 46 to 50 | 40 to 59 | 60 to 79 | 90 to 99 | 100 to 109 | 2.6 to 3.9 |
| C | Any one of (a) to (f) satisfies a corresponding condition on the right. A lower evaluation is adopted in the case of corresponding to plural judgments. | 51 or more | 39 or less | 59 or less | 89 or less | 99 or less | 4.0 or more |

Evaluation Result

The test results are shown in Table 2.

TABLE 2

| | | Examples | | | | Comparative Examples | | | | | | |
|---|---|---|---|---|---|---|---|---|---|---|---|---|
| | | 1 | 2 | 3 | 4 | 1 | 2 | 3 | 4 | 5 | 6 | 7 |
| Formulation (parts by mass) | IIR (*1) | 60 | — | 95 | — | 100 | — | — | 50 | — | 98 | — |
| | NR (*2) | — | 60 | — | 95 | — | — | — | — | 50 | — | 98 |
| | SIBS (*3) | 40 | 40 | 5 | 5 | — | 100 | 100 | 50 | 50 | 2 | 2 |
| | Carbon black (*4) | — | — | — | — | 50 | — | — | — | — | — | — |
| | Stearic acid (*5) | 3 | 3 | 3 | 3 | 3 | — | 3 | 3 | 3 | 3 | 3 |
| | Zinc oxide (*6) | 5 | 5 | 5 | 5 | 5 | — | 5 | 5 | 5 | 5 | 5 |
| | Antioxidant (*7) | 1 | 1 | 1 | 1 | 1 | — | 1 | 1 | 1 | 1 | 1 |
| | Vulcanization accelerator (*8) | 1 | 1 | 1 | 1 | 1 | — | 1 | 1 | 1 | 1 | 1 |
| | Sulfur (*9) | 0.5 | 0.5 | 0.5 | 0.5 | 0.5 | — | 0.5 | 0.5 | 0.5 | 0.5 | 0.5 |
| Evaluation | Mooney viscosity (ML1 + 4, 130° C.) | 28 | 29 | 44 | 45 | 50 | 10 | 15 | 25 | 26 | 48 | 49 |
| | Index of tackiness with carcass layer before vulcanization | 60 | 66 | 96 | 102 | 100 | 10 | 10 | 50 | 56 | 99 | 105 |

TABLE 2-continued

|  | Examples | | | | Comparative Examples | | | | | | |
| --- | --- | --- | --- | --- | --- | --- | --- | --- | --- | --- | --- |
|  | 1 | 2 | 3 | 4 | 1 | 2 | 3 | 4 | 5 | 6 | 7 |
| Index of vulcanization adhesiveness with carcass layer | 80 | 86 | 99 | 101 | 100 | 10 | 10 | 50 | 56 | 100 | 102 |
| Index of weight saving effect | 140 | 140 | 110 | 110 | 100 | 200 | 200 | 150 | 150 | 100 | 100 |
| Rolling resistance index | 104 | 103 | 103 | 102 | 100 | 110 | 110 | 105 | 105 | 101 | 101 |
| Static air pressure drop rate (%/month) | 2.2 | 2.2 | 2.5 | 2.5 | 4.0 | 2.0 | 2.0 | 3.0 | 3.0 | 3.9 | 3.9 |
| Overall judgment | A | A | A | A | C | C | C | C | C | B | B |

(*1) IIR: "Exxon chlorobutyl 1066" manufactured by Exxon Mobil Corporation
(*2) NR: natural rubber TSR20
(*3) SIBS: "SIBSTAR 102T" manufactured by Kaneka Corporation (a styrene-isobutylene-styrene triblock copolymer, weight-average molecular weight of 100,000, styrene unit content of 25% by mass, Shore A hardness of 25)
(*4) Carbon black: "Seast V" manufactured by Tokai Carbon Co., Ltd. (N660, nitrogen adsorption specific surface area: 27 $m^2/g$)
(*5) Stearic acid: "Stearic Acid Lunac S30" manufactured by Kao Corporation
(*6) Zinc oxide: "Zinc White No. 1" manufactured by Mitsui Mining & Smelting Co., Ltd.
(*7) Antioxidant: "Noclac 6C" (N-(1,3-dimethylbutyl)-N'-phenyl-p-phenylenediamine) manufactured by Ouchi Shinko Chemical Industrial Co., Ltd.
(*8) Vulcanization accelerator: "Nocceler DM" (di-2-benzothiazolyldisulfide) manufactured by Ouchi Shinko Chemical Industrial Co., Ltd.
(*9) Sulfur: "Sulfur Powder" manufactured by Tsurumi Chemical Industry Co., Ltd.

Examples 1 to 4 are polymer sheets each being composed of a polymer composition containing 60 to 95 parts by mass of IIR or NR and 40 to 5 parts by mass of SIBS and further containing additives such as sulfur, and pneumatic tires. The polymer sheets were sufficient in tackiness before vulcanization and vulcanization adhesiveness with the carcass layer. The tires were improved in weight saving effect, rolling resistance, and static air pressure drop rate as compared to Comparative Example 1 of a conventional example.

Comparative Examples 2 to 5 are polymer sheets each being composed of a polymer composition containing 0 to 50 parts by mass of IIR or NR and 10 to 50 parts by mass of SMS, and pneumatic tires. The polymer composition of Comparative Examples 3 to 5 further contain additives such as sulfur. The polymer sheets were insufficient in tackiness before vulcanization and vulcanization adhesiveness with the carcass layer.

Comparative Examples 6 and 7 are polymer sheets each being composed of a polymer composition containing 98 parts by mass of IIR or NR and 2 parts by mass of SIBS and further containing additives such as sulfur, and pneumatic tires. The polymer sheets were sufficient in tackiness before vulcanization and vulcanization adhesiveness with the carcass layer, however, the tires were similar to Comparative Example 1 of a conventional example in static air pressure drop rate, which was insufficient.

Manufacturing Examples 1 to 16

Consideration of Second Layer (Preparation of SIB)

In a 2 L reaction vessel equipped with a stirrer, 589 mL of methylcyclohexane (dried over molecular sieves), 613 mL of n-butyl chloride (dried over molecular sieves) and 0.550 g of cumyl chloride were charged. After cooling the reaction vessel to −70° C., 0.35 mL of α-picoline (2-methylpyridine) and 179 mL of isobutylene were added. Further, 9.4 mL of titanium tetrachloride was added to start polymerization, and then the solution was reacted for 2.0 hours while being stirred at −0.70° C. Next, 59 mL of styrene was added into the reaction vessel and the reaction was continued for 60 minutes, and then the reaction was terminated by adding a large amount of methanol. After removing the solvent and the like from the reaction solution, a polymer was dissolved in toluene and washed twice with water. This toluene solution was added to the methanol mixture, thereby precipitating a polymer, and the resultant polymer was dried at 60° C. for 24 hours to obtain a styrene-isobutylene diblock copolymer.

(Production of Thermoplastic Elastomer Sheet)

After mixing the respective ingredients in accordance with formulations shown in Table 3, a thermoplastic elastomer sheet was produced by a method similar to that of Example 1. The obtained thermoplastic elastomer sheet was subjected to the following evaluations.

(Tackiness with Carcass Layer Before Vulcanization)

Tackiness before vulcanization was measured by a method similar to that of Example 1, and tackiness before vulcanization of each formulation was expressed as an index using Comparative Example 1 as a reference value 100. The obtained index was evaluated on the following criterion.
A: 60 or more
B: 40 to 59
C: 39 or less (Vulcanization Adhesiveness with Carcass Layer)

Vulcanization adhesiveness was measured by a method similar to that of Example 1, and vulcanization adhesiveness of each formulation was expressed as an index using Comparative Example 1 as a reference value 100. The obtained index was evaluated on the following criterion.
A: 80 or more
B: 60 to 79
C: 59 or less (Evaluation Result)

The test results are shown in Table 3.

TABLE 3

| Formulation (parts by mass) | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Formulation (parts by mass) | SIS (*10) | 100 | 100 | — | — | — | — | 10 | — | — | 10 | — | — | 80 | 80 | 5 | 85 |
| | SIB (*11) | — | — | 100 | 100 | — | — | — | 10 | — | — | 10 | — | — | — | — | — |
| | Epoxidized SBS (*12) | — | — | — | — | 100 | 100 | — | — | 10 | — | — | 10 | — | — | — | — |
| | Natural rubber (*13) | — | — | — | — | — | — | 90 | 90 | 90 | — | — | — | 20 | — | 95 | — |
| | Butyl rubber (*14) | — | — | — | — | — | — | — | — | — | 90 | 90 | 90 | — | 20 | — | 15 |
| | Stearic acid (*5) | — | 3 | — | 3 | — | 3 | 3 | 3 | 3 | 3 | 3 | 3 | 3 | 3 | 3 | 3 |
| | Zinc oxide (*6) | — | 5 | — | 5 | — | 5 | 5 | 5 | 5 | 5 | 5 | 5 | 5 | 5 | 5 | 5 |
| | Antioxidant (*7) | — | 1 | — | 1 | — | 1 | 1 | 1 | 1 | 1 | 1 | 1 | 1 | 1 | 1 | 1 |
| | Vulcanization accelerator (*8) | — | 1 | — | 1 | — | 1 | 1 | 1 | 1 | 1 | 1 | 1 | 1 | 1 | 1 | 1 |
| | Sulfur (*9) | — | 0.5 | — | 0.5 | — | 0.5 | 0.5 | 0.5 | 0.5 | 0.5 | 0.5 | 0.5 | 0.5 | 0.5 | 0.5 | 0.5 |
| Evaluation | Index of tackiness with carcass layer before vulcanization | A | A | A | A | A | A | A | A | A | A | A | A | A | A | A | A |
| | Index of vulcanization adhesiveness with carcass layer | B | A | B | A | B | A | A | A | A | A | A | A | A | A | B | B |

(*10) SIS: "D1161JP" manufactured by Kraton Performance Polymers Inc. (a styrene-isoprene-styrene triblock copolymer, weight-average molecular weight of 150,000, styrene unit content of 15% by mass)
(*11) SIB: SIB prepared by the above-described (Preparation of SIB) (a styrene-isobutylene diblock copolymer, weight-average molecular weight of 70,000, styrene unit content of 15% by mass)
(*12) Epoxidized SBS: "Epofriend A1020" manufactured by Daicel Chemical Industries, Ltd. (an epoxy-modified styrene-butadiene-styrene copolymer, weight-average molecular weight of 10,000, epoxy equivalent of 500)
(*13) Natural rubber: TSR20
(*14) Butyl rubber: "Exxon chlorobutyl 1066" manufactured by Exxon Mobil Corporation
(*5) Stearic acid: "Stearic Acid Lunac S30" manufactured by Kao Corporation
(*6) Zinc oxide: "Zinc White No. 1" manufactured by Mitsui Mining & Smelting Co., Ltd.
(*7) Antioxidant: "Noclac 6C" (N-(1,3-dimethylbutyl)-N'-phenyl-p-phenylenediamine) manufactured by Ouchi Shinko Chemical Industrial Co., Ltd.
(*8) Vulcanization accelerator: "Nocceler DM" (di-2-benzothiazolyldisulfide) manufactured by Ouchi Shinko Chemical Industrial Co., Ltd.
(*9) Sulfur: "Sulfur Powder" manufactured by Tsurumi Chemical Industry Co., Ltd.

Manufacturing Examples 2, 4 and 6 are thermoplastic elastomer sheets each being composed of a thermoplastic elastomer composition containing the SIS, the SIB or the epoxidized SBS and additives such as sulfur. The thermoplastic elastomer sheets were sufficient in tackiness before vulcanization and vulcanization adhesiveness with the carcass layer.

Manufacturing Examples 1, 3 and 5 are thermoplastic elastomer sheets each being composed of a thermoplastic elastomer composition containing the SIS, the SIB or the epoxidized SBS and not containing any additive. The thermoplastic elastomer sheets were insufficient in vulcanization adhesiveness with the carcass layer.

Manufacturing Examples 7 to 9, 13 and 15 are thermoplastic elastomer sheets each containing natural rubber as a rubber component in the second layer. The thermoplastic elastomer sheets were sufficient in tackiness before vulcanization and vulcanization adhesiveness with the carcass layer.

Manufacturing Examples 10 to 12, 14, and 16 are thermoplastic elastomer sheets each containing butyl rubber as a rubber component in the second layer. The thermoplastic elastomer sheets were sufficient in tackiness before vulcanization and vulcanization adhesiveness with the carcass layer.

Examples 5 to 18, Comparative Examples 8 to 14

Consideration of Polymer Laminate (Production of Polymer Composition)
Polymer compositions were produced with formulations and a method similar to those of Examples 1 to 4 and Comparative Examples 1 to 7.
(Production of Polymer Laminate)
The respective ingredients in accordance with formulations shown in Tables 2 and 3 were charged into a twin-screw extruder (screw diameter: ϕ50 mm; L/D: 30; cylinder temperature: 200° C.), and kneaded at 200 rpm to obtain a pellet. The obtained pellet was charged into a co-extruder (cylinder temperature: 200° C.) to produce a polymer laminate having a thickness of 0.3 mm composed of two layers.

(Production of Pneumatic Tire)
The resultant polymer laminate was used for the inner liner part of a tire to prepare a green tire. It is to be noted that the polymer laminate was arranged so that the first layer was located at the tire radial innermost side and the second layer contacted the carcass layer of the green tire. The green tire was subjected to press molding in a mold at 170° C. for 20 minutes to obtain a vulcanized tire of 195/65R15 size. After cooling the vulcanized tire at 100° C. for 3 minutes, the vulcanized tire was removed from the mold to obtain a pneumatic tire.

Using the obtained polymer composition, the polymer laminate and the pneumatic tire, the following evaluations were performed.

(a) Mooney Viscosity
The Mooney viscosity of the polymer composition was measured by a method similar to that of Example 1.

(b) Tackiness Before Vulcanization Between First and Second Layers
The polymer laminate was held at 100 gf for 30 seconds, and peel force was measured as tackiness before vulcanization. The tackiness before vulcanization of each polymer laminate was expressed as an index by the following equation using Comparative Example 8 as a reference value 100. It shows that the greater the index of tackiness before vulcanization, the greater the tackiness before vulcanization, which is preferable.

(index of tackiness before vulcanization)=(tackiness before vulcanization of each formulation)/(tackiness before vulcanization of Comparative Example 8)×100.

(c) (Vulcanization Adhesiveness Between First and Second Layers)

The polymer laminate was heated at 170° C. for 20 minutes to obtain a sample for measuring vulcanization adhesiveness. Peel force was measured in a tensile peel test as vulcanization adhesiveness. The vulcanization adhesiveness of each polymer laminate was expressed as an index by the following equation using Comparative Example 8 as a reference value 100. It shows that the greater the index of vulcanization adhesiveness, the greater the vulcanization adhesiveness, which is preferable.

(index of vulcanization adhesiveness)=(vulcanization adhesiveness of each formulation)/(vulcanization adhesiveness of Comparative Example 8)×100

(d) Weight Saving Effect

The weight of a pneumatic tire with each polymer laminate used was expressed as an index by the following equation using Comparative Example 8 as a reference value 100. It shows that the greater the index of weight saving effect, the lighter the tire weight, which is preferable.

(index of weight saving effect)=(tire weight of Comparative Example 8)/(tire weight of each formulation)×100.

(e) Rolling Resistance

The rolling resistance of a pneumatic tire was measured by a method similar to that of Example 1. The rolling resistance of a pneumatic tire with each polymer laminate used was expressed as an index by the following equation using Comparative Example 8 as a reference value 100. It shows that the greater the rolling resistance index, the smaller the rolling resistance, which is preferable.

(rolling resistance index)=(rolling resistance of Comparative Example 8)/(rolling resistance of each formulation)×100

(f) Static Air Pressure Drop Rate

The tire air pressure drop rate (%/month) was measured by a method similar to that of Example 1.

Overall Judgment

Criteria for overall judgment are as shown in Table 4.

TABLE 4

| Overall judgment | Judgment criteria | (a) Mooney viscosity of first layer | (b) Index of tackiness between first and second layers before vulcanization | (c) Index of vulcanization adhesiveness between first and second layers | (d) Rolling resistance index | (e) Index of weight saving effect | (f) Static air pressure drop rate (%/month) |
|---|---|---|---|---|---|---|---|
| A | All of (a) to (f) satisfy conditions on the right. | 45 or less | 60 or more | 80 or more | 100 or more | 110 or more | 2.5 or less |
| B | Any one of (a) to (f) satisfies a corresponding condition on the right. A lower evaluation is adopted in the case of corresponding to plural judgments. | 46 to 50 | 40 to 59 | 60 to 79 | 90 to 99 | 100 to 109 | 2.6 to 3.9 |
| C | Any one of (a) to (f) satisfies a corresponding condition on the right. A lower evaluation is adopted in the case of corresponding to plural judgments. | 51 or more | 39 or less | 59 or less | 89 or less | 99 or less | 4.0 or more |

Evaluation Result

The test results are shown in Tables 5 and 6.

TABLE 5

| | | Examples | | | | Comparative Examples | | | | | | |
|---|---|---|---|---|---|---|---|---|---|---|---|---|
| | | 5 | 6 | 7 | 8 | 8 | 9 | 10 | 11 | 12 | 13 | 14 |
| Lamination structure | First layer | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
| | Second layer | Manufacturing Example 2 | Manufacturing Example 2 | Manufacturing Example 2 | Manufacturing Example 2 | Manufacturing Example 2 | Manufacturing Example 2 | Manufacturing Example 2 | Manufacturing Example 2 | Manufacturing Example 2 | Manufacturing Example 2 | Manufacturing Example 2 |
| Evaluation | Mooney viscosity (ML1 + 4, 130° C.) | 28 | 29 | 44 | 45 | 50 | 10 | 15 | 25 | 26 | 48 | 49 |
| | Index of tackiness between first and second layers before vulcanization | 75 | 85 | 83 | 93 | 100 | 20 | 20 | 45 | 45 | 95 | 105 |

TABLE 5-continued

|  |  | Examples | | | | Comparative Examples | | | | | | |
| --- | --- | --- | --- | --- | --- | --- | --- | --- | --- | --- | --- | --- |
|  |  | 5 | 6 | 7 | 8 | 8 | 9 | 10 | 11 | 12 | 13 | 14 |
|  | Index of vulcanization adhesiveness between first and second layers | 85 | 95 | 95 | 105 | 100 | 20 | 20 | 45 | 50 | 99 | 109 |
|  | Index of weight saving effect | 140 | 140 | 110 | 110 | 100 | 200 | 200 | 150 | 150 | 100 | 100 |
|  | Rolling resistance index | 104 | 103 | 103 | 102 | 100 | 110 | 110 | 105 | 105 | 101 | 101 |
|  | Static air pressure drop rate (%/month) | 2.2 | 2.2 | 2.5 | 2.5 | 4.0 | 2.0 | 2.0 | 3.0 | 3.0 | 3.9 | 3.9 |
|  | Overall judgment | A | A | A | A | C | C | C | C | C | B | B |

TABLE 6

|  |  | Examples | | | | | | | | | |
| --- | --- | --- | --- | --- | --- | --- | --- | --- | --- | --- | --- |
|  |  | 9 | 10 | 11 | 12 | 13 | 14 | 15 | 16 | 17 | 18 |
| Lamination structure | First layer | Example 1 | Example 1 | Example 2 | Example 2 | Example 3 | Example 3 | Example 4 | Example 4 | Example 1 | Example 1 |
|  | Second layer | Manufacturing Example 7 | Manufacturing Example 10 | Manufacturing Example 7 | Manufacturing Example 10 | Manufacturing Example 7 | Manufacturing Example 10 | Manufacturing Example 7 | Manufacturing Example 10 | Manufacturing Example 13 | Manufacturing Example 14 |
| Evaluation | Mooney viscosity (ML1 + 4, 130° C.) | 39 | 37 | 39 | 37 | 42 | 41 | 42 | 41 | 37 | 35 |
|  | Index of tackiness between first and second layers before vulcanization | 78 | 88 | 85 | 75 | 70 | 85 | 82 | 70 | 75 | 85 |
|  | Index of vulcanization adhesiveness between first and second layers | 100 | 110 | 107 | 97 | 95 | 105 | 102 | 93 | 92 | 102 |
|  | Index of weight saving effect | 140 | 140 | 140 | 140 | 110 | 110 | 110 | 110 | 110 | 110 |
|  | Rolling resistance index | 104 | 105 | 103 | 104 | 103 | 104 | 102 | 103 | 105 | 106 |
|  | Static air pressure drop rate (%/month) | 2.0 | 1.9 | 2.2 | 2.0 | 2.1 | 2.0 | 2.2 | 2.0 | 1.9 | 1.8 |
|  | Overall judgment | A | A | A | A | A | A | A | A | A | A |

Examples 5 to 8 are polymer laminates containing the polymer sheets of Examples 1 to 4, respectively, as the first layer and the thermoplastic elastomer sheet of Manufacturing Example 2 as the second layer, and pneumatic tires. The polymer laminates were sufficient in tackiness before vulcanization and vulcanization adhesiveness between the first and second layers. The tires were improved in weight saving effect, rolling resistance, and static air pressure drop rate as compared to Comparative Example 8.

Examples 9 to 18 are polymer laminates containing the polymer sheets of Examples 1 to 4, respectively, as the first layer and the thermoplastic elastomer sheets of Manufacturing Examples 7, 10, 13, and 14, respectively, as the second layer, and pneumatic tires. The polymer laminates were sufficient in tackiness before vulcanization and vulcanization adhesiveness between the first and second layers.

Comparative Examples 9 to 12 are polymer laminates containing the polymer sheets of Examples 1 to 4, respectively, as the first layer and the thermoplastic elastomer sheet of Manufacturing Example 2 as the second layer, and pneumatic tires. The polymer laminates were insufficient in tackiness before vulcanization and vulcanization adhesiveness between the first and second layers.

Comparative Examples 13 and 14 are polymer laminates containing the polymer sheets of Comparative Examples 6 and 7, respectively, as the first layer and the thermoplastic elastomer sheet of Manufacturing Example 2 as the second layer, and pneumatic tires. The polymer laminates were sufficient in tackiness before vulcanization and vulcanization adhesiveness between the first and second layers, however, the pneumatic tires were similar to Comparative Example 8 in static air pressure drop rate, which was insufficient.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An inner liner of a polymer laminate comprising:
a first layer composed of a polymer composition including a polymer component containing more than or equal to 5% by mass and less than or equal to 40% by mass of a styrene-isobutylene-styrene triblock copolymer and more than or equal to 60% by mass and less than or equal to 95% by mass of a rubber component of at least one kind selected from the group consisting of natural rubber, isoprene rubber, and butyl rubber, and more than or equal to 0.1 part by mass and less than or equal to 5 parts by mass of sulfur with respect to 100 parts by mass of said polymer component; and a second layer composed of a thermoplastic elastomer composition containing a thermoplastic elastomer, and more than or equal to 0.1 part by mass and less than or equal to 5 parts by mass of sulfur with respect to 100 parts by mass of said thermoplastic elastomer;

wherein said styrene-isobutylene-styrene triblock copolymer has a weight-average molecular weight more than or equal to 50,000 and less than or equal to 400,000 and a styrene unit content more than or equal to 10% by mass and less than or equal to 30% by mass; and wherein said second layer further contains a rubber component of at least one kind selected from the group consisting of natural rubber, isoprene rubber, and butyl rubber, in addition to said thermoplastic elastomer composition, said rubber component being more than or equal to 20% by mass and less than or equal to 90% by mass with respect to a total of said thermoplastic elastomer composition and said rubber component.

2. The inner liner in accordance with claim 1, wherein said polymer composition further contains, with respect to 100 parts by mass of said polymer component, more than or equal to 1 part by mass and less than or equal to 5 parts by mass of stearic acid, more than or equal to 0.1 part by mass and less than or equal to 8 parts by mass of zinc oxide, more than or equal to 0.1 part by mass and less than or equal to 5 parts by mass of an antioxidant, and more than or equal to 0.1 part by mass and less than or equal to 5 parts by mass of a vulcanization accelerator.

3. The inner liner in accordance with claim 1, wherein said thermoplastic elastomer is of at least one kind selected from the group consisting of: a styrene-isoprene-styrene triblock copolymer; a styrene-isobutylene diblock copolymer; a styrene-butadiene-styrene triblock copolymer; a styrene-isoprene.butadiene-styrene triblock copolymer; a styrene-ethylene.butene-styrene triblock copolymer; a styrene-ethylene.propylene-styrene triblock copolymer; a styrene-ethylene.ethylene.propylene-styrene triblock copolymer; a styrene-butadiene.butylene-styrene triblock copolymer; and their epoxy-modified thermoplastic elastomers.

4. The inner liner in accordance with claim 1, wherein said second layer includes at least one of an SIS layer with said thermoplastic elastomer composed of a styrene-isoprene-styrene triblock copolymer, an SIB layer with said thermoplastic elastomer composed of a styrene-isobutylene diblock copolymer, and an epoxidized SBS layer with said thermoplastic elastomer composed of an epoxidized styrene-butadiene-styrene triblock copolymer.

5. The inner liner in accordance with claim 4, wherein said styrene-isoprene-styrene triblock copolymer has a weight-average molecular weight more than or equal to 100,000 and less than or equal to 290,000 and a styrene unit content more than or equal to 10% by mass and less than or equal to 30% by mass.

6. The inner liner in accordance with claim 4, wherein said styrene-isobutylene diblock copolymer is linear and has a weight-average molecular weight more than or equal to 40,000 and less than or equal to 120,000 and a styrene unit content more than or equal to 10% by mass and less than or equal to 35% by mass.

7. The inner liner in accordance with claim 4, wherein said epoxidized styrene-butadiene-styrene triblock copolymer has a weight-average molecular weight more than or equal to 10,000 and less than or equal to 400,000, a styrene unit content more than or equal to 10% by mass and less than or equal to 30% by mass, and an epoxy equivalent more than or equal to 50 and less than or equal to 1,000.

8. The inner liner in accordance with claim 1, wherein said thermoplastic elastomer composition further contains, with respect to 100 parts by mass of said thermoplastic elastomer, more than or equal to 1 part by mass and less than or equal to 5 parts by mass of stearic acid, more than or equal to 0.1 part by mass and less than or equal to 8 parts by mass of zinc oxide, more than or equal to 0.1 part by mass and less than or equal to 5 parts by mass of an antioxidant, and more than or equal to 0.1 part by mass and less than or equal to 5 parts by mass of a vulcanization accelerator.

9. A pneumatic tire, comprising the inner liner as defined in claim 1.

10. A pneumatic tire, comprising:

an inner liner of a polymer laminate, comprising:

a first layer composed of a polymer composition including a polymer component containing more than or equal to 5% by mass and less than or equal to 40% by mass of a styrene-isobutylene-styrene triblock copolymer and more than or equal to 60% by mass and less than or equal to 95% by mass of a rubber component of at least one kind selected from the group consisting of natural rubber, isoprene rubber, and butyl rubber, and more than or equal to 0.1 part by mass and less than or equal to 5 parts by mass of sulfur with respect to 100 parts by mass of said polymer component; and a second layer composed of a thermoplastic elastomer composition containing a thermoplastic elastomer, and more than or equal to 0.1 part by mass and less than or equal to 5 parts by mass of sulfur with respect to 100 parts by mass of said thermoplastic elastomer.

* * * * *